(12) United States Patent
Lyons et al.

(10) Patent No.: US 6,202,346 B1
(45) Date of Patent: Mar. 20, 2001

(54) SEED COATINGS

(75) Inventors: John M. Lyons, Johnston; Richard L. Long, Huxley; G. Edwin Burgess, Johnston, all of IA (US)

(73) Assignees: Pioneer Hi-Bred International, Inc., Johnston; Coating Machinery Systems, Inc., Ames, both of IA (US)

( * ) Notice: Subject to any disclaimer, the term of this patent is extended or adjusted under 35 U.S.C. 154(b) by 0 days.

(21) Appl. No.: 09/297,408

(22) PCT Filed: Oct. 30, 1997

(86) PCT No.: PCT/US97/19799

§ 371 Date: Apr. 29, 1999

§ 102(e) Date: Apr. 29, 1999

(87) PCT Pub. No.: WO98/18311

PCT Pub. Date: May 7, 1998

Related U.S. Application Data

(60) Provisional application No. 60/029,800, filed on Oct. 31, 1996.

(51) Int. Cl.[7] .................................................. A01C 1/06
(52) U.S. Cl. .............................................................. 47/57.6
(58) Field of Search ...................................... 47/57.6, 58.1

(56) References Cited

U.S. PATENT DOCUMENTS

| | | | |
|---|---|---|---|
| 3,545,129 | | 12/1970 | Schreiber et al. . |
| 3,698,133 | * | 10/1972 | Schreiber .............................. 47/57.6 |
| 3,703,404 | * | 11/1972 | Kirk ....................................... 47/57.6 |
| 3,808,740 | * | 5/1974 | Porter et al. ........................... 47/57.6 |
| 3,905,152 | * | 9/1975 | Loperfido .............................. 47/57.6 |
| 4,251,952 | * | 2/1981 | Porter et al. ........................... 47/57.6 |
| 4,272,417 | | 6/1981 | Barke et al. . |
| 4,624,694 | * | 11/1986 | DelliColli ............................. 47/57.6 |
| 4,665,648 | * | 5/1987 | Branco et al. ........................ 47/57.6 |
| 4,881,343 | * | 11/1989 | Sannan et al. ........................ 47/57.6 |
| 5,918,413 | * | 6/1999 | Otani et al. ........................... 47/57.6 |

FOREIGN PATENT DOCUMENTS

| | | | |
|---|---|---|---|
| 2.071.376 | | 9/1971 | (FR) . |
| 670461 | | 9/1949 | (GB) . |
| 2 025 200 | | 1/1980 | (GB) .............................. A01C/1/06 |
| 5-192011 | * | 8/1993 | (JP) ...................................... 47/57.6 |

* cited by examiner

*Primary Examiner*—Peter M. Poon
*Assistant Examiner*—Jeffrey L. Gellner
(74) *Attorney, Agent, or Firm*—Zarley, McKee, Thomte, Voorhees & Sease

(57) ABSTRACT

Seed coatings and methods of their use are described. The coatings comprise limestone or other water insoluble particulate matter which either includes a polymer in the limestone layer or a separate polymer coating on top of the limestone layer. The coatings may also include a coloring agent. The coatings offer the advantages of making the seed size more desirable and provide a more aesthetically pleasing appearance to the seeds.

4 Claims, 1 Drawing Sheet

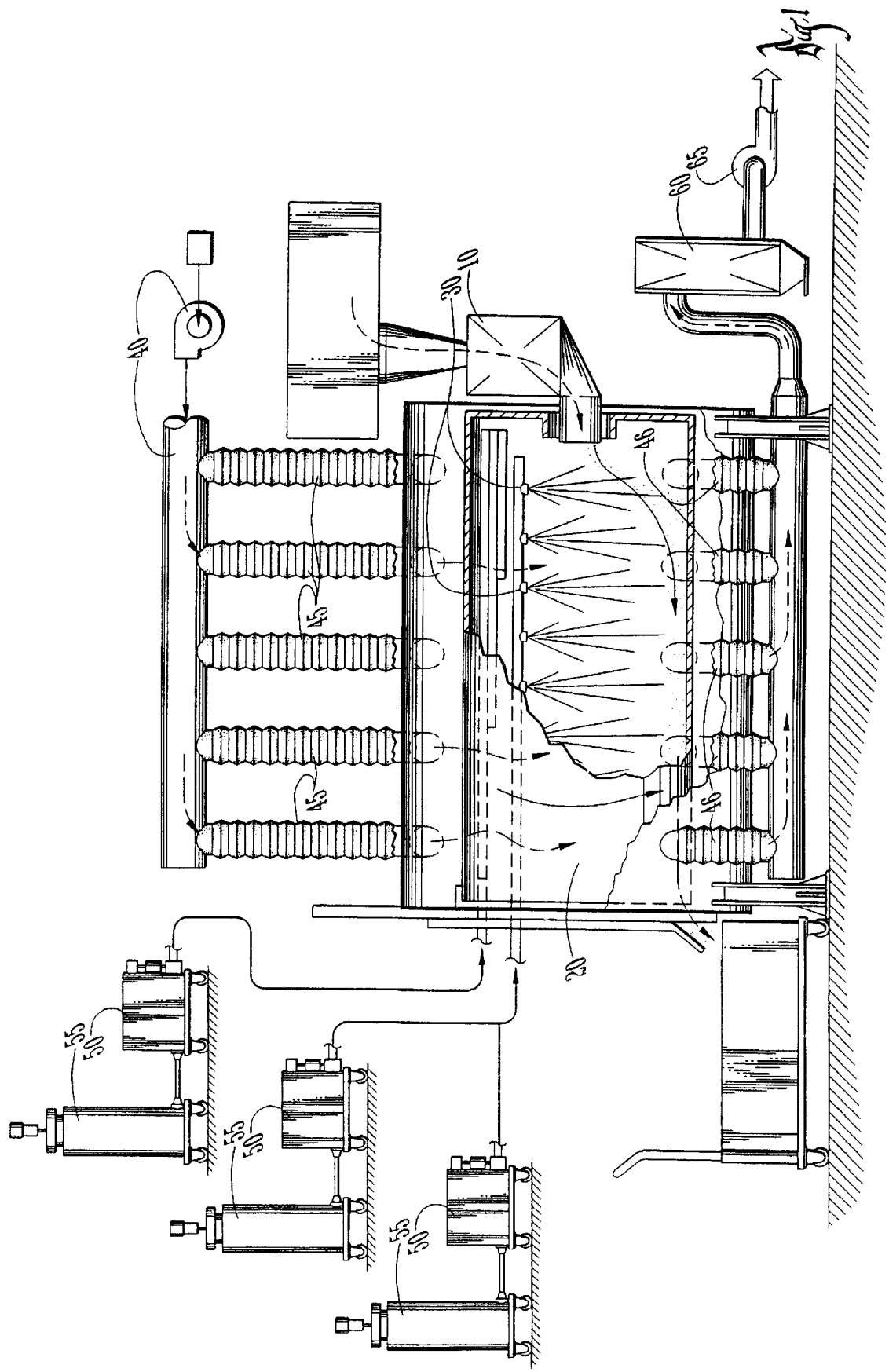

SEED COATINGS

This application claims benefit of provisional application 60/029,800, filed Oct. 31, 1996.

BACKGROUND OF THE INVENTION

Planting seeds is one of the most important methods of propagating many species of plants. Examples of plants which may be propagated from seeds include vines such as cucumbers, watermelons, and cantaloupes, flowers such as marigolds, zinnias, and pansies, cereals and small grains such as corn, wheat, oats, and barley, forage crops and grasses, such as alfalfa, lespedeza, clover, orchard grass, bluegrass and fescue, beans such as soybeans, string beans, pinto beans, navy beans and lima beans, peas such as English peas, chickpeas and black-eyed peas, and shrubbery and trees such as juniper, cedar, holly, pine, poplar and maple.

Normally, seeds are placed directly in the soil at the proper depth and spacing for the species being planted. Certain types of seeds, however, are extremely small which often makes planting difficult. These smaller seeds are also difficult to see which also adds to the difficulty of their planting. Examples of small seeds include alfalfa, celery and any type of grass seed.

Alfalfa seeds are much smaller than most seeds. Attempts to alleviate the problems associated with planting alfalfa seeds have included coating the seeds to make them larger and therefore easier to see and to plant. Seed coatings have also been used to house other ingredients to enhance seed propagation, such as pesticides, moldicides, fungicides, filler, and nutrients including nitrogen, potassium, and phosphorus.

The current industry standard for coating alfalfa seeds is to place the coating on the seed in an amount based on 33% of the weight of the seed. These coatings have been applied using a rotary drum method wherein the seed is tumbled while the coating composition is sprayed thereon and a stream of hot air is directed at the coated seeds. Other coating methods include pan-type arrangements, all of which are well known in the art.

There are several problems associated with these thick coatings. First, the coatings often do not stick to the seed well and can also chip and crack. This can cause the planters to get clogged or messy. Further, the thick coating impedes the rate of the flow of seeds in planters. This also leads to planter clogging.

It is therefore an object of the present invention to provide a seed coating to coat various types of seeds to make them easier to plant.

It is a further object of the present invention to provide a seed coating which does not clog or make a mess in planters.

It is a further object of the present invention to provide a seed coating which provides a seed size which is more acceptable to customers.

It is still a further object of the present invention to provide a seed coating which increases the size of seeds which would otherwise have to be discarded.

It is still a further object of the present invention to provide a thin seed coating for seeds that would be too large with the conventional coating and would otherwise have to be discarded.

It is yet another object of the present invention to provide a seed coating which allows seeds to flow easier through planters than conventionally coated seeds.

A further object of the present invention is to provide a seed coating which makes the seed easy to recognize and is aesthetically pleasing.

It is yet another object of the present invention to provide a seed coating which is economical to manufacture.

These and other objects of this invention are described more fully hereinafter.

SUMMARY OF THE INVENTION

The coating of the present invention primarily comprises an insoluble particulate material, such as limestone or clay, which may contain a water-based, water-soluble, polymer. The limestone or clay is used to build-up the size of the seed and the polymer is used as a binder and protects the coating from chipping. A coloring agent may optionally be added to the polymer layer to make the seed easier to see and to improve the appearance of the seed. This type of coating is very light-weight and can increase the size of very small seeds for ease in planting. Seeds which may be coated according to the invention include but are not limited to any kind of grass seeds, alfalfa seeds, or celery seeds. Any seed can be used with the methods of the invention, however it is particularly useful for small seeds such as alfalfa which benefit from a size increase.

One embodiment of the invention entails applying a limestone/polymer coating to alfalfa seeds so as to increase the weight of the seed by about 4.5% to about 30% preferably about 4.5% to about 20% and most preferably about 9.5% to about 15%. This coating can then be sealed with a separate polymer coating. The coatings are preferably applied using a continuous coating machine system.

The coatings of the present invention has the advantages of making seeds which are either too large or too small a more uniform and acceptable size for customers. Further, the coated seeds flow well through planters. The seeds also have a more aesthetically pleasing appearance. In addition, the coating can be more economically applied to seeds using the continuous coating machine system. Continuous coating machines useful for applying the coatings of the invention are described and disclosed in the following United States patents by Richard L. Long, Jr., the disclosures of which are hereby expressly incorporated by reference: U.S. Pat. Nos. 5,494,709 and 5,443,637.

The following definitions are useful for interpreting the invention disclosed herein.

Coated/Pelleted seed

The deposition of a layer of inert materials that obscure the original shape and size of the seed resulting in a substantial weight increase and improved plantability. The addition of biologicals, pesticides, identifying colorants or dyes and/or other active ingredients including polymers can be included in this process.

Film coated seed

Film coated seed retains the shape and the general size of the raw seed with a minimal weight gain. The film coating may contain polymers, pesticides, biologicals, identifying colorants or dyes, and other additives. The coating should result in more/less continuous covering which eliminates or minimizes product dust-off.

Inoculated seed

Seed which has received a coating of a commercial preparation containing a microbial product i.e., Rhyzobia sp.

Primed seed

Seed that has been subjected to a procedure (biotic or abiotic) that reduces dormancy, promotes faster and/or more uniform germination. (Not to include physical processes such as scarification which are normally considered a conditioning operation.)

Raw seed

Seed that is free of any added foreign or inert materials. Not inoculated, treated, pelleted or coated.

Treated seed

Seed with a minimal covering of various materials whose primary objective is to reduce or control certain disease organisms, insects or other pests attacking the seed or seedlings growing therefrom and contains identifying colorants or dyes.

Working Sample

Purity—The sample on which the purity analysis is made. Noxious-weed seed—The sample on which the noxious-weed seed examination is made.

BRIEF DESCRIPTION OF THE DRAWING

FIG. 1 is a diagram of a coating machine system useful for the present invention.

DETAILED DESCRIPTION OF THE PREFERRED EMBODIMENT

In accordance with the present invention, various types of seeds are coated with a coating comprising an insoluble particulate material, such as limestone or clay, wherein the limestone either contains a polymer or is coated with a separate polymer layer. The insoluble particulate material can be sandy loam, powdered talc, ground limestone, powdered silica, powdered vermiculite, etc. Limestone is the preferred material. The particle size of the material is not critical and may vary over wide ranges. The particle size may be, for example, from 1 inch to −300 mesh (Tyler Screen) and is preferably from −10 mesh to −300 mesh.

When the insoluble material is combined with a polymer, such as when used to coat alfalfa seeds as set forth in one embodiment of the invention, it comprises from about 40–80% w/w of the coating. If only limestone, polymer, and water are used in the coating, the limestone will comprise about 60–80% of the coating and the polymer from about 1–10%. If other ingredients are included, the most preferred amount of insoluble material is about 61–65% and the preferred amount of polymer is about .5–3%.

When the insoluble material is used without the polymer, a binder must be added. Suitable binders include molasses, granulated sugar, alginates, karaya gum, jaguar gum, tragacanth gum, polysaccharide gum and mucilage. The amount of binder present in the layer will range from about 1% to about 10% w/w. To facilitate coating of the seed it may be desirable to include a plasticizer in the formulation. Such materials are liquid at the temperature used for coating and generally should be miscible with the binder. Suitable plasticizers include glycerol, propylene glycol, and polyglycols. When a plasticizer is used, it will usually be in an amount not exceeding about 10% of the weight of the binder. Preferably, the plasticizer is present in a concentration of about 1% of the binder weight. Suitable selection of plasticizer and its amount may be made by perusal of standard references and simple determinations of viscosity and other properties.

The insoluble material may also contain one or more other additives such as plant health products, more particularly insecticides, nematicides, fungicides, disinfectants, repellents, herbicides and growth regulators, agents capable of protecting seeds from the harmful effects of selective herbicides such as activated carbon, nutrients (fertilizers), agents capable of improving the germination and quality of the products, bacteria capable of exerting a favorable effect on the germination, establishment of growth of plants etc.

It should also be appreciated that other layers of additives may be placed on the seed before or after applying the insoluble material. For example, innoculants are often applied to seeds to increase nodulation. Rhyzobia innoculants are one type which can be added. These are known in the art and are commercially available. There are generally two types of rhyzobia innoculants, clay based and peat based. Either is useful for the invention. A preferred innoculant is a clay based innoculant. The innoculant, however, can be toxic to the handler if exposed to large quantities of the product over extensive periods of time. To alleviate this problem, the innoculant can be applied prior to applying the limestone or polymer layer to prevent contact with the innoculant by the handler. A fungicide may also be added to further stimulate germination and growth. Several of these are also commercially available. One such fungicide is Apron XL.

The polymer of the invention comprises a water-based, water-soluble polymer. The term "water-soluble polymer" as used herein refers to water solubility at room temperature. The polymer is preferably of the polyvinyl family of polymers which include but are not limited to polyvinyl alcohol, hydrolyzed polyvinyl acetates, polyvinyl methyl ether, polyvinyl methyl ether-maleic anhydride, and polyvinylpyrrolidone. These polymers are well known in the art and are available from several companies including CMS, Celpril, Colorcon, Seppic, and Incotec. In a preferred embodiment the polymer is polyvinyl alcohol which is 95% pure and which also comprises sodium acetate and methylene alcohol at about 3%. Often these polymers also include a carbohydrate filler. When combined with the limestone or other insoluble particulate material, the polymer comprises from about 1% to about 10% w/w of the coating. The most preferred amount of polymer is about 6%. When the polymer is applied alone, it is mixed with water in a 40–80% polymer solution.

The water soluble polymeric material may be mixtures of a polymeric material and a carbohydrate which is a sugar. The term "sugar" is used herein in the broad sense to indicate any of the well known class of sweet carbohydrates having 6 or 12 carbon atoms in the molecule i.e. the monosaccharides and disaccharides, and capable of being processed into a fine, essentially powdered form. Examples of such sugars include but are not limited to sucrose, glucose, maltose, dextrose, lactose, levulose and mixtures thereof including invert sugar. The preferred sugars are the disaccharides. The sugar may be contained within the polymer/sugar mixture in an amount of from ⅛ to 6 parts by weight of sugar per part by weight of said polymeric material.

The seed coating may further contain a coloring agent. The coloring agent is used to make it easier for farmers to easily identify the seed and for aesthetic purposes. Examples of acceptable coloring agents include the dyes green #7 and red #48. These dyes are available from Gustafson and other dye manufacturers and are well known to those of ordinary skill in the art. When used on alfalfa seeds, the preferred colorant is green #7. When combined with limestone and polymer, the dye should comprise from about 0.5% to about 10% w/w of the coating. The most preferred amount of coloring agent is between about 1–2%. If the polymer is placed in a separate layer, the colorant should be placed in this layer in the same concentration.

The limestone/polymer coating also contains water, which may be tap water, distilled, sterilized, deionized, etc. The water should be present in an amount of from about 30% to about 50% w/w. The most preferred amount of water is about 40%.

Other optional ingredients include surfactants and fungicides. In a most preferred embodiment an anti-foaming agent such as polyethylene glycol or glycerine is also used. For instance, a surfactant can be added in an amount of from about 0.01% to about 5% w/w, with about 0.1% being preferred. Similarly, a fungicide, such as Apron XLS®, may be added to the coating in an amount of from about 0.01% to about 5%. In a most preferred embodiment the seed has a first layer of polymer, fungicide and limestone.

It may be desirable for the coatings described above to be encapsulated in a clear polymer film coating. The polymer film seals in the ingredients, reduces dust, and adds shine. The same type of water permeable polymer as described above may be used for this purpose. The thickness of the layer is not crucial but may be in the range of from about 0.05–0.10 mm.

The seed to be coated will dictate the type of coating described above which will be employed. For example, with alfalfa seeds the coating used is the limestone/polymer coating wherein the coating is applied in an amount to increase the seed weight in an amount between about 4.5% to about 30%. The alfalfa seed coating preferably includes a colorant to distinguish it from other types of seeds, and to easily observe and thus facilitate planting, preferably this colorant is green.

The preferred coating procedure of the invention is a continuous coating machine. One such machine is available through Coating Machinery Systems, Inc. (Huxley, Iowa) (hereinafter "CMS") which is the owner of a patented machine disclosed in U.S. Pat. Nos. 5,494,709 and 5,443,637. The present coating process includes three components that function together. FIG. 1 is a diagram of the CMS continuous coating system as used with the other two components of the system. The continuous coating machine makes it possible to apply the thinner coatings where it was previously not possible using batch coating machinery.

The first system consists of fans, heater and dust collectors for supply and return air. The supply air is first injected into the CMS coating system where the chemicals are flash dried onto the seed. The return air is captured by a cartridge filter bag house. The return air is cleaned and discharged to the atmosphere. The components of this system are commercially available.

The second system consists of the CMS seed coating equipment and related transfer equipment. The CMS components consist of one two-drum machine and one single-drum machine. These pieces of equipment move the seed through the coating process.

The third system consists of the plumbing, piping, and mixing equipment that allow the chemicals to be batched and then injected into the coating process. The components of this system are commercially available through several sources.

The complete system can optionally be operated by a programmable logic controller. This use of computer controls allows various equipment to be started and stopped without employee intervention. This computer system verifies and coordinates the batching, mixing, and pumping of the solutions. Additionally, this computer system monitors the seed input to the coating system, thereby maintaining a constant flow of the appropriate amount of seed. Finally, the computer system keeps watch over the air input while monitoring for adequate inlet and outlet temperatures. This computer system is available from CMS.

As shown in FIG. 1, the continuous coating machine consists of air-atomized spray guns 30, a pump 50, a rotating perforated drum 20, and air handling equipment, including an inlet heater and fan 40, inlet air ducts 45, a dust collector 60 and an exhaust fan 65. The system further includes an infeed shute 10 and a solution tank 55.

In practice, seeds are fed into the machine via the infeed chute 10 to allow for precision metering. The seed enters the rotating drum 20 and the coating solution which is mixed in solution tank 55 (water, lime, polymer are mixed for around approximately 2 hours before application) is applied through pump 50 to spray guns 30. The spray guns 30 begin applying the coating material as the seed rotates in the drum 20. After the seed has been coated to pre-specified parameters, the seed exits the rotating drum 20 and is ready for packaging or is transferred into another infeed chute for a second coating application. In the meantime, air enters the system through inlet heater and fan 40, goes through air inlet ducts 45 and through the perforated drum where it contacts the seeds in the rotating drum 20. The air then exits the rotating drum 20 through air outlet ducts 46 at the bottom of the system where it then goes through dust collector 60 and finally through exhaust fan 65.

As the name implies, the continuous process machine allows the product to flow continuously throughout the product run. New product enters the machine in a steady stream to replace coated product that has exited the machine. The continuous coating process is ideal for high volume seed coating. The most unique aspect of using the CMS continuous coating machine is that the coating material, which utilizes water as a carrier solution, is flash dried almost immediately after application, leaving the product dry and ready for packaging. The approximate temperature range employed in the continuous coating machine is from about 180°–250° F.

In a most preferred embodiment the same basic machinery can be used in an enrobing process. This type of process will provide even higher through-put rates. Three drums or sections are used for coating purposes in this system. As used herein the term drum does not require an entire separate unit. The 3 drums may be different sections all embodied within a single drum or container. For a continuous flow process a third drum was optionally employed for drying only.

Section or Drum #1 (of the three drum or section system)

Drum or section #1 is charged with seed as shown in FIG. 1 and as described for the continuous flow process. Polymer, lime water and colorant are applied.

Preferably water, surfactant and polymer are applied with the first two guns, and lime, polymer, water and colorant are applied with the remainder of the guns.

This is as described in the continuous flow process. However, in the previous process the seeds were sprayed and dried as the seed coating was built up. With the enrobing system the airflow to drum or section #1 is turned off and approximately four to five times the amount of fluid (lime, polymer, colorant and water) is sprayed as in the earlier process. The coating accumulation is dependent upon the slurry and seed rubbing together as the seed progresses down the drum slope.

Section or Drum #2 (of the three drum system)

In the enrobing system, drum two is used for drying of the product coating only. There is no spraying of coating solutions within drum number two, in contrast to the continuous flow system.

Section or Drum #3 (of the three section or drum system)

Polymer, water and colorant optionally along with any inoculant are sprayed as described in the continuous flow process. Inoculant may be added to the inlet product stream.

The following example is provided to further illustrate the invention. It is not intended to limit the invention in any manner.

EXAMPLE

Coating of Alfalfa Seeds

The surfactant Apron XL® in conjunction with polymer and colorant is first applied to alfalfa seeds using water and a finely ground agricultural lime carrier. This part of the process occurs within a first drum in a three drum coating system. The water, lime, Apron XL®, polymer, and colorant solution is then flash dried by high temperature air entering the coating chamber (approximately 250° F.). The return air leaving the chamber will be approximately 180° F. and will be carrying the water injected with the chemicals. The lime, Apron XL®, and polymer solution will comprise approximately 50% of the seed coat weight gain.

As the seed passes from the first to the second drum, Nitrogen Gold inoculate is applied in a dry powder form. The Nitrogen Gold will adhere to the still moist lime, Apron XL®, polymer, and colorant coating. The second drum will be used to apply an additional coating of lime, polymer, and colorant to the seed coat. It is this second step that will bind the hazardous chemicals to the seed coat and minimize chemical exposure to the customer. This drum will comprise approximately 40% of the seed coat.

The third drum or section will provide for a final coating of polymer and colorant. However, the primary reason for the third drum is to allow for adequate drying of the seed coating compound. This drum will comprise approximately 10% of the total weight of the seed coat.

The coatings described above offer several advantages. First, with respect to alfalfa and other extremely small seeds, the layer makes the seeds easier to see for planting purposes without making the coatings too thick. The thinner layer prevents the coating from interfering with the flow of the seeds in the planter. In fact, it has been determined that the limestone/polymer coating allows the seeds to flow as easily through the planter as uncoated seeds. Further, the coating does not crack or peel and therefore does not clog the planter. The addition of green colorant to the alfalfa seeds makes them distinguishable from other types of seeds as well as easier to see. The coatings of the invention comprise about 4.5% to about 30% of the weight of the seed and preferably comprises 9.5 to 15%.

The thinner coating also serves a practical purpose. The conventional 33.3% weight gain seed coatings resulted in customers receiving less seed for their money. For example, a customer buying a 100 lb. bag of alfalfa seed would end up with 66% seed and 33% coating. By using a thinner coating, the farmer will receive a much larger proportion of seed in comparison to the amount of coating.

EXAMPLE 2

Coating of Alfalfa Seeds (Enrobing Process)

Drum 1 is charged with raw seed. Apron XL® in conjunction with polymer and colorant is first applied to alfalfa seeds using water and a finely ground agricultural lime carrier. The first application comprises surfactant, water and polymer. This may be accomplished through the use of 2 guns in the CMS system. The remaining guns apply the lime, polymer, water and colorant. The air flow is turned off. This part of the process occurs within a first drum in a three drum coating system. No drying occurs in this drum. The lime, fungicide such as Apron XL®, and polymer solution will comprise approximately 50% of the seed coat weight gain.

In the second drum or section no solutions are added and the drum or section is used for drying only.

As the seed passes from the second to the third drum, Nitrogen Gold™ inoculate is added to the inlet stream, and polymer, water and colorant are applied with all of the guns.

The enrobing process offer several other advantages including a higher throughput than the continuous flow process, while still retaining the characteristics and advantages of the continuous flow process.

The above description thus sets forth novel seed coatings as well as the methods of their application. It further demonstrates the substantial advantages present in using the seed coatings on various types of seed to achieve different purposes. It is therefore submitted that the present invention accomplishes at least all of its stated objectives.

What is claimed is:

1. A seed coating for small seeds comprising a water soluble polymer; and a water insoluble solid particulate coating matter wherein said coating comprises from about 4.5% to about 30% of the weight of the seed and wherein the polymer comprises from about 1% to about 10% w/w of the coating, the water insoluble solid particulate coating material comprises from about 40% to about 80% w/w of the coating, and the water comprises from about 30% to about 50% w/w of the coating.

2. A seed coating according to claim 1 wherein the polymer comprises about 6% of the coating, the water insoluble solid particulate coating material comprises about 53% of the coating, and the water comprises about 40% of the coating.

3. A seed coating for small seeds comprising: a water soluble polymer wherein the polymer comprises about 1% to about 10% w/w of the coating and a water insoluble solid particulate coating matter wherein the water insoluble particulate matter comprises from about 40% to about 80% w/w of the coating, and water comprises from about 30% to about 50% w/w of the coating and wherein the coating comprises from about 4.5% to about 20% of the weight of the seed.

4. A seed coating according to claim 3 wherein the polymer comprises about 6% of the coating, the water insoluble solid particulate coating material comprises about 53% of the coating, and the water comprises about 40% of the coating.

* * * * *